US006633113B2

(12) United States Patent
Xia et al.

(10) Patent No.: US 6,633,113 B2
(45) Date of Patent: Oct. 14, 2003

(54) FOCUSING ELECTRODE AND METHOD FOR FIELD EMISSION DISPLAYS

(75) Inventors: Zhongyi Xia, Boise, ID (US); Jimmy J. Browning, Boise, ID (US); Charles M. Watkins, Eagle, ID (US); David A. Cathey, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/146,627

(22) Filed: May 14, 2002

(65) Prior Publication Data

US 2002/0125478 A1 Sep. 12, 2002

Related U.S. Application Data

(62) Division of application No. 09/256,018, filed on Feb. 23, 1999, now Pat. No. 6,504,291.

(51) Int. Cl.$^7$ ............................ H01J 1/02; G06F 17/00

(52) U.S. Cl. ...................... 313/309; 313/496; 313/336; 700/90

(58) Field of Search ................................ 313/309, 496, 313/336, 495, 351; 700/90

(56) References Cited

U.S. PATENT DOCUMENTS

| | | | | |
|---|---|---|---|---|
| 4,233,623 A | | 11/1980 | Pavliscak | 385/59 |
| 4,891,110 A | | 1/1990 | Libman et al. | 204/181.1 |
| 4,940,916 A | * | 7/1990 | Borel et al. | 313/306 |
| 5,093,217 A | | 3/1992 | Datta et al. | 430/28 |
| 5,212,426 A | * | 5/1993 | Kane | 315/169.1 |
| 5,229,331 A | * | 7/1993 | Doan et al. | 438/20 |
| 5,455,132 A | | 10/1995 | Ritt et al. | 430/23 |
| 5,501,928 A | | 3/1996 | Datta et al. | 430/23 |
| 5,528,103 A | | 6/1996 | Spindt et al. | 313/497 |
| 5,593,562 A | * | 1/1997 | Vickers | 204/486 |
| 5,762,773 A | * | 6/1998 | Rasmussen | 204/485 |
| 5,928,821 A | | 7/1999 | Garrity, Jr. et al. | 430/23 |
| 6,068,750 A | * | 5/2000 | Rasmussen | 204/490 |

OTHER PUBLICATIONS

Shin–Sun Kim et al., "Resisivity effect of $ZnGa_2O_4$:Mn phosphor screen on cathodoluminescence characteristics of field emission display", J. Vac. Sci. Technol. B 16(4), Jul./Aug. 1998, 1998 American Vacuum Society, pp. 2086–2090.

S.A. Bukesov et al., "Electrophysical characteristics and low–energy cathodoluminescence of vacuum fluorescent display and field emission display screens", J. Vac. Sci. Technol. B 16(4), Jul./Aug. 1998, 1998 American Vacuum Society, pp. 2082–2085.

* cited by examiner

*Primary Examiner*—Frank G. Font
*Assistant Examiner*—Roy M. Punnoose
(74) *Attorney, Agent, or Firm*—Dorsey & Whitney LLP

(57) ABSTRACT

A high resolution field emission display includes a faceplate and a baseplate. The faceplate includes a transparent viewing layer, a transparent conductive layer formed on the transparent viewing layer and intersecting stripes of light-absorbing, opaque insulating material formed on the transparent conductive layer. The insulating material defines openings less than one hundred microns wide between the intersecting stripes. The faceplate also includes a plurality of localized regions of cathodoluminescent material, each formed in one of the openings. The cathodoluminescent material includes a metal oxide providing reduced resistivity in the cathodoluminescent material. Significantly, the reduced resistivity of the cathodoluminescent material together with the focusing effect of the insulating material provide increased acuity in luminous images formed on the faceplate. The baseplate includes a substrate, an emitter formed on the substrate and a dielectric layer formed on the substrate and having an opening formed about the emitter. The baseplate also includes a conductive extraction grid formed on the dielectric layer and having an opening formed about the emitter.

8 Claims, 3 Drawing Sheets

FOCUSING ELECTRODE AND METHOD FOR FIELD EMISSION DISPLAYS

CROSS-REFERENCE TO RELATED APPLICATION

This application is a divisional of U.S. patent application No. 09/256,018, filed Feb. 23, 1999, now U.S. Pat. No. 6,504,291.

STATEMENT OF GOVERNMENT INTEREST

This invention was made with government support under Contract No. DABT63-93-C-0025 awarded by Advanced Research Projects Agency (ARPA). The government has certain rights in this invention.

TECHNICAL FIELD

This invention relates in general to visual displays for electronic devices and in particular to improved focusing apparatus and techniques for field emission displays.

BACKGROUND OF THE INVENTION

FIG. 1 is a simplified cross-sectional view of a portion of a field emission display 10 including a faceplate 20 and a baseplate 21, in accordance with the prior art. FIG. 1 is not drawn to scale. The faceplate 20 includes a transparent viewing screen 22, a transparent conductive layer 24 and a cathodoluminescent layer 26. The transparent viewing screen 22 supports the layers 24 and 26, acts as a viewing surface and as a wall for a hermetically sealed package formed between the viewing screen 22 and the baseplate 21. The viewing screen 22 may be formed from glass. The transparent conductive layer 24 may be formed from indium tin oxide. The cathodoluminescent layer 26 may be segmented into localized portions. In a conventional monochrome display 10, each localized portion of the cathodoluminescent layer 26 forms one pixel of the monochrome display 10. Also, in a conventional color display 10, each localized portion of the cathodoluminescent layer 26 forms a green, red or blue sub-pixel of the color display 10. Materials useful as cathodoluminescent materials in the cathodoluminescent layer 26 include $Y_2O_3$:Eu (red, phosphor P-56), $Y_3(Al, Ga)_5O_{12}$:Tb (green, phosphor P-53) and $Y_2(SiO_5)$:Ce (blue, phosphor P-47) available from Osram Sylvania of Towanda Pa. or from Nichia of Japan.

The baseplate 21 includes emitters 30 formed on a planar surface of a substrate 32, which may include semiconductor materials. The substrate 32 is coated with a dielectric layer 34. In one embodiment, this is effected by deposition of silicon dioxide via a conventional TEOS process. The dielectric layer 34 is formed to have a thickness that is approximately equal to or just less than a height of the emitters 30. This thickness is on the order of 0.4 microns, although greater or lesser thicknesses may be employed. A conductive extraction grid 38 is formed on the dielectric layer 34. The extraction grid 38 may be formed, for example, as a thin layer of polysilicon. The radius of an opening 40 created in the extraction grid 38, which is also approximately the separation of the extraction grid 38 from the tip of the emitter 30, is about 0.4 microns, although larger or smaller openings 40 may also be employed.

In operation, the extraction grid 38 is biased to a voltage on the order of 100 volts, although higher or lower voltages may be used, while the substrate 32 is maintained at a voltage of about zero volts. Intense electrical fields between the emitter 30 and the extraction grid 38 cause field emission of electrons from the emitter 30 in response to the voltages impressed on the extraction grid 38 and emitter 30.

A larger positive voltage, also known as an anode voltage $V_A$, ranging up to as much as 5,000 volts or more but often 2,500 volts or less, is applied to the faceplate 20 via the transparent conductive layer 24. The electrons emitted from the emitter 30 are accelerated to the faceplate 20 by the anode voltage $V_A$ and strike the cathodoluminescent layer 26. This causes light emission in selected areas, i.e., those areas adjacent to where the emitters 30 are emitting electrons, and forms luminous images such as text, pictures and the like.

When the emitters 30 emit electrons, the resultant beam of electrons spreads as the electrons travel from the emitter 30 towards the faceplate 20. When the electron emissions associated with a first localized portion of the cathodoluminescent layer 26 also impact on a second localized portion of the cathodoluminescent layer 26, both the first and second localized portions of the cathodoluminescent layer 26 emit light. As a result, the first pixel or sub-pixel uniquely associated with the first localized portion of the cathodoluminescent layer 26 correctly turns on, and at least a portion of a second pixel or sub-pixel uniquely associated with the second localized portion of the cathodoluminescent layer 26 incorrectly turns on. In a color field emission display 10, this can cause purple light to be emitted from a blue sub-pixel and a red sub-pixel together when only red light from the red sub-pixel was desired. This is problematic because it degrades the image formed on the faceplate 20 of the field emission display 10.

In a monochrome field emission display 10, color distortion does not occur, but the resolution of the image formed on the faceplate 20 is reduced by this spreading of the electron beams from the emitters 30. This is exacerbated in either type of field emission display 10 as the resolution of the field emission display 10 is increased by crowding pixels or sub-pixels more closely together.

A second problem that may occur is that the entire emitted beam of electrons may travel at an angle to the path that they were intended to take, i.e., form a tilted beam of electrons. This may occur because of electrostatic effects involving interactions with other pixels. Alternatively, variations in shapes of tips of the emitters 30 or in extraction grid 38 geometry resulting from normal manufacturing variability may result in some electron beams being tilted relative to others. As a result, more than one pixel may be impacted by an electron beam intended to result in light emission from only a single pixel.

These problems may be referred to as bleedover. The likelihood of bleedover is increased by any misalignment between the localized portions of the cathodoluminescent layer 26 and their associated sets of emitters 30. Additionally, as the current from any one of the emitters 30 is increased, the problem of bleedover increases.

In some applications, a small field emission display 10 is intended to be viewed through magnifying optics, such as lenses or magnifying reflectors. These applications require a high resolution field emission display 10. High resolution field emission displays 10 use fewer emitters 30 per pixel or sub-pixel. This arises for several reasons, one of which is that a smaller pixel or sub-pixel subtends a smaller area in which the emitters 30 can be provided. As a result, each emitter 30 in a high resolution field emission display 10 has a greater influence on the light emitted from the pixel or sub-pixel associated with it. This increases the need to be able to control electron emissions and the spread of electron emissions from each emitter 30.

In conventional field emission displays 10, attempts have been made to alleviate bleedover in several ways. The anode voltage $V_A$ applied to the transparent conductive layer 24 of the conventional field emission display 10 is a relatively high voltage, such as 1,000 volts or more, so that the electrons emitted from the emitters 30 are strongly accelerated to the faceplate 20. As a result, the electron emissions spread out less as they travel from the emitters 30 to the faceplate 20. The gap between the faceplate 20 and the baseplate 21 of the conventional field emission display 10 is relatively small (ca. one thousandth of an inch or twenty-five microns per 100 volts of anode voltage $V_A$), again reducing opportunity for spreading of the emitted electrons.

Some solutions that have been tried for reducing bleedover either increase the anode voltage $V_A$ applied to the transparent conductive layer 24 or decrease the spacing between the faceplate 20 and the baseplate 21 in order to reduce spreading of the electron emissions. However, it has been found that these are impractical solutions because the anode voltage $V_A$ applied between the transparent conductive layer 24 and the baseplate 21 may cause arcing when either of these solutions is attempted.

Another way in which bleedover is reduced in conventional field emission displays 10 is by spacing the localized portions of the cathodoluminescent layer 26 relatively far apart. This is possible because of the relatively low display resolution provided by conventional field emission displays 10. As a result, the electron emissions impact the correct localized portion of the cathodoluminescent layer 26. However, as the resolution of images displayed by field emission displays 10 increases, the localized portions of the cathodoluminescent layer 26 are necessarily crowded closer together. As a result, bleedover may occur.

One solution that has been employed in conventional cathode ray tubes is to metalize the back surface of the cathodoluminescent layer 26. However, in field emission displays 10, this technique would require an increase of several hundred percent in the anode voltage $V_A$ in order to achieve the same luminosity. However, an increase of anode voltage $V_A$ in field emission displays 10 requires an increased separation between the faceplate 20 and the baseplate 21. As a result, the electron beam from each emitter 30 spreads out even more in traveling from the emitter 30 to the faceplate 20. Additionally, the increased anode voltage $V_A$ itself is objectionable from the perspectives of power consumption and circuit complexity.

One approach to controlling the spatial spread of electrons emitted from a group of the emitters 30 is to surround the area emitting the electrons with a focusing electrode (not shown). This allows increased control over the spatial distribution of the emitted electrons via control of the voltage applied to the focusing electrode, which in turn provides increased resolution for the resulting image. One such approach, where each focusing element serves many emitters, is described in U.S. Pat. No. 5,528,103, entitled "Field Emitter With Focusing Ridges Situated To Sides Of Gate," issued to Spindt et al.

Disadvantages to the prior art approaches include the need for another voltage source for the focusing electrode and problems due to variations in turn-on voltage from one emitter 30 to another. When a group of emitters 30 are all affected by a single focusing electrode, some of the emitters 30 may exhibit a turn-on voltage that differs from that exhibited by other emitters 30. The effect that the focusing electrode has on the electrons emitted from each of these emitters 30 will differ. Additionally, some of the current through the emitters 30 will be collected by the focusing electrode. This complicates the relationship between the current through the emitter 30 and the amount of light that is generated at the faceplate 20 because some of the current through the emitter 30 is diverted en route to the faceplate 20 by the focusing electrode. Further, the effects of the focusing electrode may be different for emitters 30 that are closer to the focusing electrode than for emitters 30 that are farther away from the focusing electrode. The lack of control over the amount of light emitted in response to a known emitter current results in poorer imaging characteristics for the display 10.

In magnified, high resolution field emission displays 10, each pixel must be able to provide higher light output because the intensity of the illumination when it reaches the eye of the viewer is reduced in proportion to the magnification needed in order to view it. As a result, the current density in each pixel is increased relative to larger field emission displays 10. As discussed in "Resistivity Effect of $ZnGa_2O_4$:Mn Phosphor Screen on Cathodoluminescence Characteristics of Field Emission Display" by S. S. Kim et al., J. Vac. Sci. Technol. B 16(4), July August 1998, resistance in the cathodoluminescent layer 26 itself can significantly affect luminance through several mechanisms, as is explained below in more detail.

A first mechanism is due to a voltage drop occurring in the cathodoluminescent layer 26. Most cathodoluminescent materials are formed from metal oxides or sulfides having resistivities p on the order of $10^{10}$ Ω-cm. An exception is ZnO:Zn, which has a resistivity on the order of $10^6$ Ω-cm, but which is poorly suited for use in color field emission displays 10. The materials used to form the cathodoluminescent layer 26 typically are powdered and have particle sizes on the order of two microns or less. In order to provide a reasonably uniform cathodoluminescent layer 26, it is necessary to deposit a cathodoluminescent layer 26 that is three or more particles thick, or six to ten microns thick.

Electrons incident on the cathodoluminescent layer 26 typically only excite fifteen to thirty Angstroms of that portion of the cathodoluminescent layer 26 that is closest to the emitters 30. Although the cathodoluminescent layer 26 is formed on the transparent conductive layer 24, which is typically indium tin oxide having a sheet resistivity of about 25 Ω/□, the voltage drop through the cathodoluminescent layer 26 can amount to a significant percentage of the anode voltage $V_A$ applied to the transparent conductive layer 24. In some experiments using low anode voltages $V_A$ in vacuum fluorescent displays, the anode voltage $V_A$ is reduced by as much as seventy percent or more from one side of the cathodoluminescent layer 26 to the other, thereby reducing the electron-attracting effect of the anode voltage $V_A$ substantially. As a result, the number of electrons arriving in the pixel per unit time is reduced, reducing pixel luminosity.

A second mechanism in which the resistance of the cathodoluminescent layer 26 affects pixel luminosity involves localized heating of the cathodoluminescent layer 26 due to the increased current through the cathodoluminescent layer 26. The localized heating reduces the efficiency of the cathodoluminescent layer 26. This phenomenon is known as "thermal quenching" of the cathodoluminescent materials making up the cathodoluminescent layer 26. As a result, the luminosity per incident electron decreases, providing a darker pixel than is needed. Useful lifetime of the cathodoluminescent layer 26, and hence of the display 10 incorporating the cathodoluminescent layer 26, may also be reduced.

All of these effects tend to degrade linearity of the relationship between current through the emitter 30 and luminosity of the pixel associated with the emitter 30. A linear relationship between these two quantities greatly simplifies useful and effective operation of field emission displays 10.

There is therefore a need for a way to increase the linearity of the relationship between pixel luminosity and emitter current to provide robust field emission displays, and especially high resolution field emission displays, without significantly increasing fabrication complexity for such displays.

SUMMARY OF THE INVENTION

In accordance with one aspect of the invention, a field emission display includes a faceplate having a transparent viewing layer, a transparent conductive layer formed on the transparent viewing layer and a grille of light-absorbing, opaque insulating material formed on the transparent conductive layer and defining openings within the grille. The light absorption and opacity of the grille increases the contrast of the faceplate. The faceplate also includes a plurality of pixels formed of cathodoluminescent material. Each pixel is formed in one of the openings. The cathodoluminescent material includes a noncathodoluminescent material providing reduced resistivity in the cathodoluminescent material.

Significantly, the light-absorbing, opaque insulating material charges electrostatically in direct response to bleedover of electrons from any one pixel or sub-pixel. As a result, localized electrostatic fields provide enhanced focusing performance together with reduced circuit complexity compared to prior art approaches. Additionally, the noncathodoluminescent material results in more accurate control of voltages accelerating electrons towards the cathodoluminescent material. This, in turn, results in superior display performance, especially for high resolution field emission displays.

DETAILED DESCRIPTION OF THE INVENTION

Figure 2:
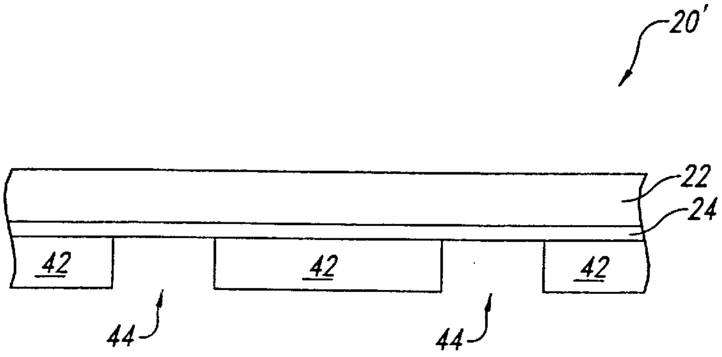
FIG. 2 is a simplified cross-sectional view of a faceplate at one stage in fabrication, in accordance with an embodiment of the present invention.

FIG. 2 is a simplified cross-sectional view of a faceplate 20' at one stage in fabrication, in accordance with an embodiment of the present invention. The faceplate 20' includes the transparent viewing screen 22 and the transparent conductive layer 24. In one embodiment, the transparent conductive layer 24 is a layer of indium tin oxide formed by sputtering. The transparent conductive layer 24 typically has a thickness of 150 to 200 nanometers, an optical transmissivity in excess of 90% to 95% and a sheet resistivity of about 25 $\Omega/\square$.

The faceplate 20' is coated with a photoresist 42 that is compatible with electrophoretic deposition. The photoresist 42 is conventionally masked, exposed to light of appropriate wavelength and intensity and is then developed to provide elongated openings 44 in the photoresist 42. Although not shown in FIG. 2, spaced-apart elongated openings are also formed perpendicular to the openings 44 to form a grid pattern. The openings may be of any shape and may be arranged in any pattern with respect to one another.

For example, polyvinyl alcohol and an ammonium dichromate sensitizer can be used to form photoresist 42 that is compatible with isopropyl alcohol as a carrier medium during electrophoretic deposition. This photoresist 42 does not conduct electricity. As a result, electrophoresis may be used to selectively deposit particles from a colloidal suspension (not shown in FIG. 2) into the openings 44 using the transparent conductive layer 24 as one electrode in a conventional electrophoretic deposition process.

Figure 3:
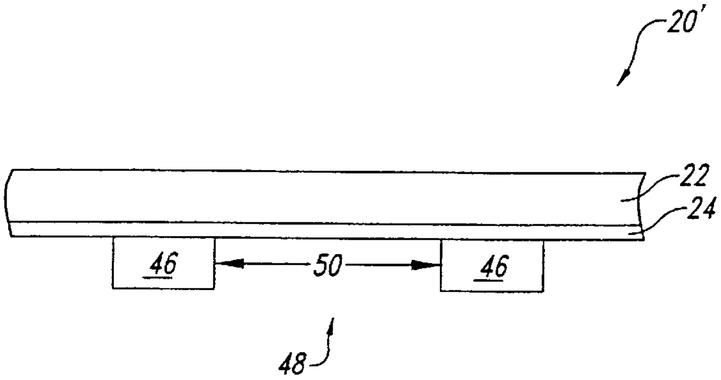
FIG. 3 is a simplified cross-sectional view of the faceplate of FIG. 2 at a later stage in fabrication, in accordance with embodiments of the present invention.

FIG. 3 is a simplified cross-sectional view of the faceplate 20' of FIG. 2 at a later stage in fabrication, in accordance with an embodiment of the present invention. In one embodiment of the faceplate 20', an insulating, opaque and light-absorbing material is deposited in the openings 44, and the resist 42 is then removed, thereby leaving a grille 46 formed on the conductive layer 24. In one embodiment, the grille 46 is formed by electrophoretic deposition of materials such as cobalt oxide, manganese oxide or chromium oxide through the grille pattern formed in the photoresist 42 of FIG. 2. In one embodiment, the grille 46 has a thickness of five to ten microns.

Hydrated nitrates of lanthanum, cerium, indium or aluminum may be added to the isopropyl alcohol as electrolytes to provide conductivity during the electrophoretic deposition of the grille 46. In one embodiment, these electrolytes also act as a binding agent in the grille 46, lending robustness to the grille 46 and binding the grille 46 to the transparent conductive layer 24, after suitable treatment. In some embodiments, following electrophoretic deposition of the grille 46, the photoresist layer 42, the grille 46 and the transparent layers 22 and 24 are baked in atmosphere at a temperature of about 400° C. for fifteen to thirty minutes to dry the grille 46 and to decompose the photoresist layer 42. Alternatively, plasma ashing in an oxygen-bearing plasma may be used to strip the photoresist layer 42. In some embodiments, the grille 46 is five to ten microns thick and defines openings 48 having a width 50 that is about twenty five microns on a side or larger. Each of the openings 48 form individual pixels at a later stage in fabrication. In some embodiments, the grille 46 includes openings having a width that is less than one hundred microns.

In another embodiment, the grille 46 is formed by conventional sputtering of a layer of material such as cobalt oxide, manganese oxide or chromium oxide on the transparent conductive layer 24. Photoresist is then applied over the sputtered layer and patterned to form an etch mask. Following etching of the sputtered layer but not the transparent conductor, the photoresist is stripped, forming the grille 46.

Figure 4:
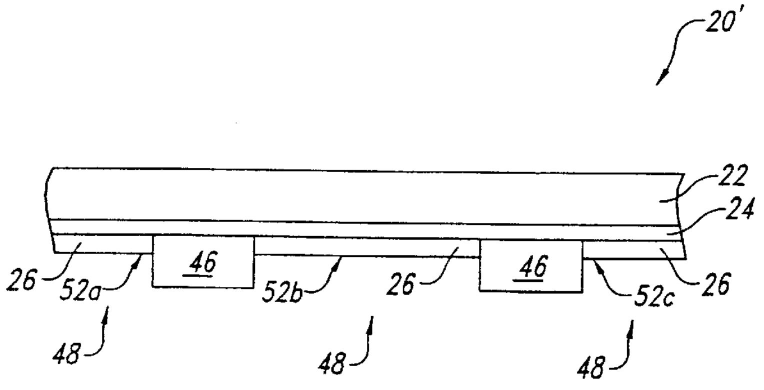
FIG. 4 is a simplified cross-sectional view of the faceplate of FIG. 3 at a later stage in fabrication, in accordance with an embodiment of the present invention.

FIG. 4 is a simplified cross-sectional view of the faceplate 20' of FIG. 3 at a later stage in fabrication, in accordance with embodiments of the present invention. Following formation of the grille 46, cathodoluminescent layers 26 are sequentially deposited through photoresist masking layers via conventional electrophoresis into selected openings 48 to form pixels or sub-pixels 52. For example, a first sub-pixel 52*a* may include $Y_2O_3$:Eu cathodoluminescent material 26 to emit red light when bombarded by electrons. An adjacent sub-pixel 52*b* may include $Y_3(Al, Ga)_5O_{12}$:Tb cathodoluminescent material 26 to emit green light when bombarded by electrons. Another adjacent sub-pixel 52*c* may include $Y_2(SiO_5)$:Ce cathodoluminescent material 26 to emit blue light when bombarded by electrons. In color displays 10, each sub-pixel 52 of one color will have nearest neighbors including sub-pixels 52 of each of the other two colors used in the display 10.

Figure 5:
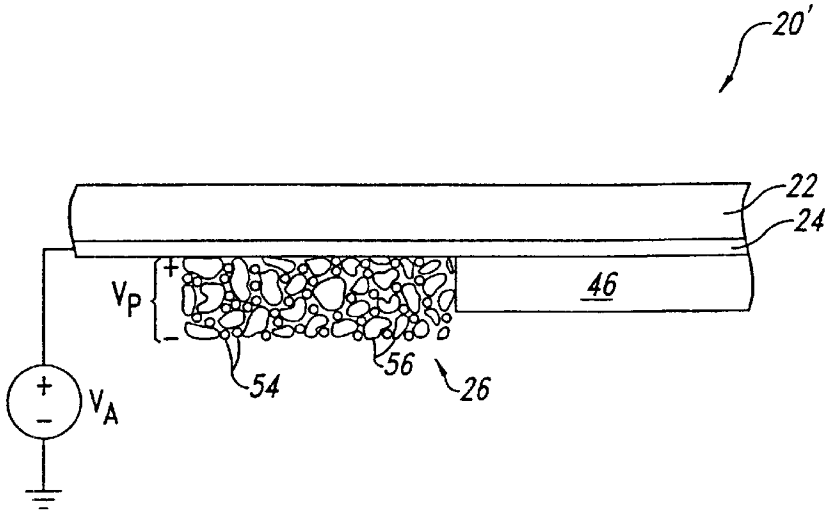
FIG. 5 is a simplified and magnified cross-sectional view of the faceplate of FIG. 4, showing details of the cathodoluminescent layer, in accordance with an embodiment of the present invention.

FIG. 5 is a magnified cross-sectional view of the faceplate 20' of FIG. 4, showing details of the cathodoluminescent layer 26, in accordance with embodiments of the present invention. The material forming the cathodoluminescent layer 26 includes a mixture of particles 54 of powdered conductive material and particles 56 of cathodoluminescent material. The conductive particles 54 are provided to reduce the resistivity p in the cathodoluminescent layer 26. For clarity of illustration and ease of understanding, the particles 54 of powdered conductive material are illustrated as being round dots, while the particles 56 of cathodoluminescent material are illustrated as being irregular, however, it will be understood that these shapes are for purposes of illustration only.

In some embodiments, the particles 54 of powdered conductive material are formed from powdered metal oxides. As used herein, the term "metal oxide" refers to metal oxides that do not exhibit significant cathodoluminescent activity in response to electron bombardment, while the term "cathodoluminescent material" refers to compounds, that may include combinations of metal atoms and oxygen, exhibiting light emission in response to bombardment by electrons.

In one embodiment, the cathodoluminescent layers 26 forming the pixels 52 of FIG. 4 are deposited by conventional electrophoresis using mixtures of particles 56 of powdered cathodoluminescent materials and particles 54 of powdered metal oxides such as indium oxide, tin oxide, tungsten trioxide and vanadium pentoxide. In one embodiment, the particles 56 forming the powdered cathodoluminescent materials have a diameter of two microns or less. In one embodiment, the particles 54 forming the powdered conductive materials have diameters that are less than one-half micron in diameter. In one embodiment, the particles 54 forming the powdered metal oxides have diameters that are no more than one-fourth of the average diameter of the particles 56 forming the powdered cathodoluminescent materials. In one embodiment, the powdered metal oxides form between 0.1 and five weight percent of the combination of the powdered cathodoluminescent particles 56 and the powdered metal oxide particles 54 forming the cathodoluminescent layer 26.

The difference between the sizes of the metal oxide particles 54 and the cathodoluminescent particles 56 allow the metal oxide particles 54 to pack into interstices between the cathodoluminescent particles 56. In one embodiment, the metal oxide particles 54 reduce the resistivity $\rho$ of the composite cathodoluminescent layer 26 to less than $10^9$ $\Omega$-cm. As a result, a voltage $V_P$ that would otherwise develop across the cathodoluminescent layer 26 in response to current through the cathodoluminescent layer 26 is reduced. The voltage $V_P$ tends to reduce the anode voltage $V_A$ applied to the transparent conductive layer 24 as manifested on the side of the cathodoluminescent layer 26 that is facing the emitters 30, causing electrons from the emitters 30 to be less strongly attracted to the cathodoluminescent layer 26.

In operation, embodiments of the faceplate 20' of the present invention provide several advantages, especially for very high resolution field emission displays 10 of the type intended to be viewed through magnifying optics. The insulating grille 46 between the conductive transparent layer 24 and the emitters 30 causes electrons that miss the openings 48 (FIG. 3) defining pixels 52 (FIG. 4) to electrically charge localized portions of the grille 46. The degree of localized charging is related to the number of electrons that miss the intended pixel 52, and the location of the localized charging is coincident with locations at which that portion of the incident electron beam is missing the intended pixel 52. A localized electrostatic field is thus provided, focusing the electron beam back towards the intended pixel 52. As a result, the insulating grille 46 provides a self-focusing mechanism that is related to the proportion of the electron beam that is missing the intended pixel 52.

Combining the focusing effect of the grille 46 with the resistivity reduction of the particles 54 of metal oxide provides more accurately defined electron bombardment of the pixels 52. This more accurate control of electron bombardment both increases the luminosity of the pixels 52 by increasing the effect of the anode voltage $V_A$ and increases the optical contrast between the illuminated pixels 52 and surrounding areas. Significantly, the luminosity, contrast and acuity of images formed on small displays 10 that are intended to be viewed through magnifying optics are improved.

Additional advantages of embodiments of the present invention include not requiring a conductive focusing electrode (not shown) to be formed on an intervening insulator (not shown) formed on the transparent conductive layer 24. Displays requiring such focusing electrodes risk catastrophic failure when the focusing electrode forms an electrical arc through the intervening insulator, or across the surface of the insulator to one or more pixels 52. Fabrication of the faceplate 20 is more complex because additional lithographic steps are required in order to define the intervening insulator and to define the focusing electrode. Further, no focusing electrode power supply (not shown) is required if there is no focusing electrode, simplifying design and production requirements for the display 10.

Moreover, combining the metal oxide particles 54 with the cathodoluminescent particles 56 provides reduced resistivity $\rho$ in the cathodoluminescent layer 26. As a result, the amount of electrical power that is dissipated in the cathodoluminescent layer 26 is reduced, thereby reducing resistive heating of the cathodoluminescent layer 26. Thermal quenching of the cathodoluminescent layer 26 is reduced, increasing both light output from the display 10 and useful life of the faceplate 20'. These factors are particularly significant in high resolution displays 10.

It will be appreciated that the faceplate 20' that has been described includes what is known as a "blanket" anode, i.e., the transparent conductive layer 24 is not segregated into electrically distinct areas. Advantages to the blanket anode formed by the transparent conductive layer 24 include not having to switch anode voltages $V_A$, not having to cope with electrical noise resulting from switching high anode voltages $V_A$ and being able to simultaneously activate red 52*a*, green 52*b* and blue 52*c* pixels by switching voltages coupled to the extraction grid 38 and the emitters 30 associated with the pixels 52*a*, 52*b* and 52*c*.

The grille 46 used in embodiments of the present invention is also useful in color sequencing field emission displays 10. Color sequencing displays 10 electrically separate the portions of the transparent conductive layer 24 for each of the colors to be displayed. The anode voltage $V_A$ is first switched to allow the red pixels 52*a* to be operated, then the anode voltage $V_A$ is switched to allow the green pixels 52*b* to be operated and then the anode voltage $V_A$ is switched to allow the blue pixels 52*c* to be operated. As a result, color sequencing displays 10 require three times as high a switching speed for a given frame rate as do displays 10 using transparent conductive layers 24 formed into blanket anodes.

Figure 1:
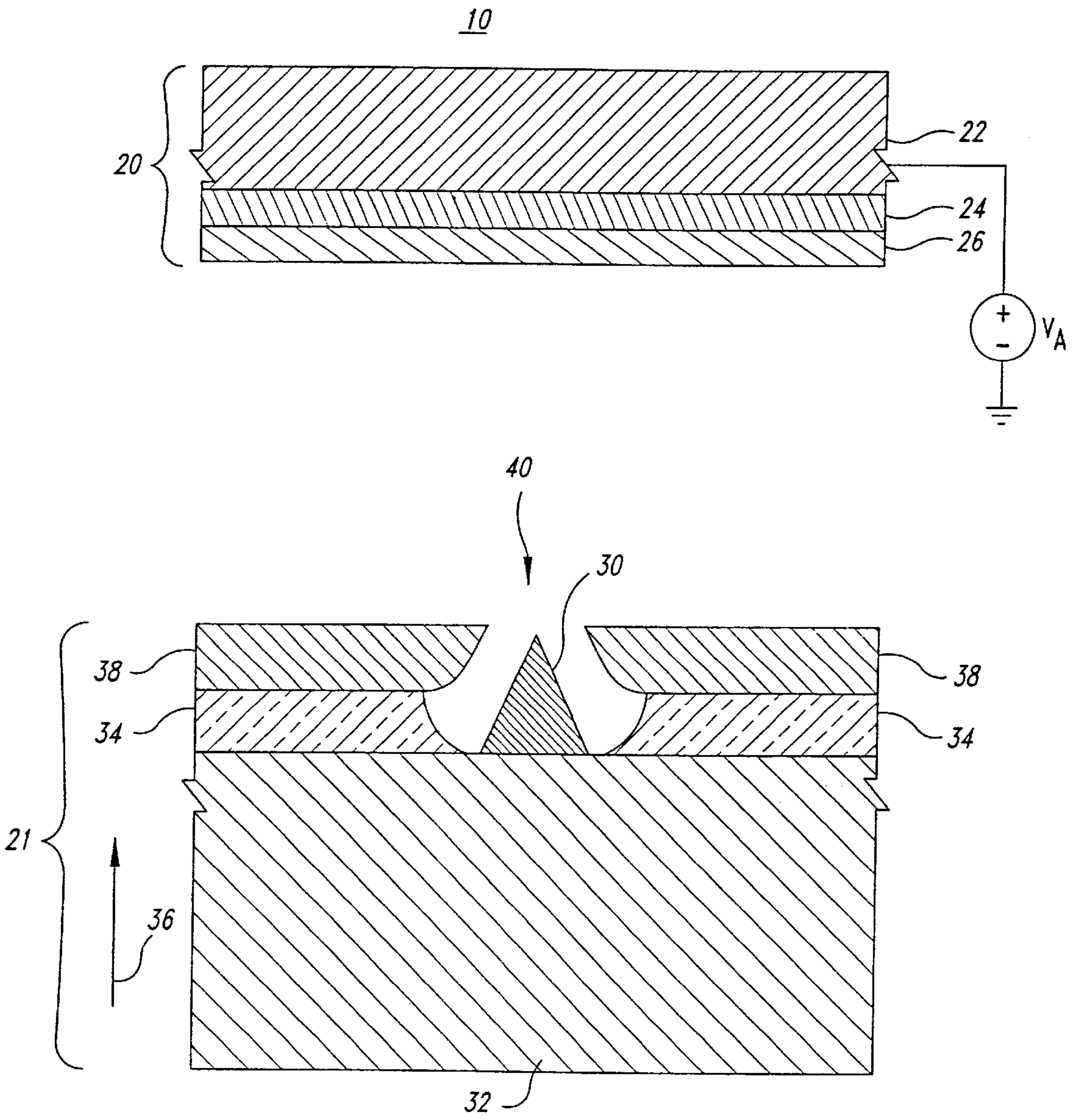
Fig. 1 (PRIOR ART)
FIG. 1 is a simplified cross-sectional view of a portion of a field emission display according to the prior art.
Figure 6:
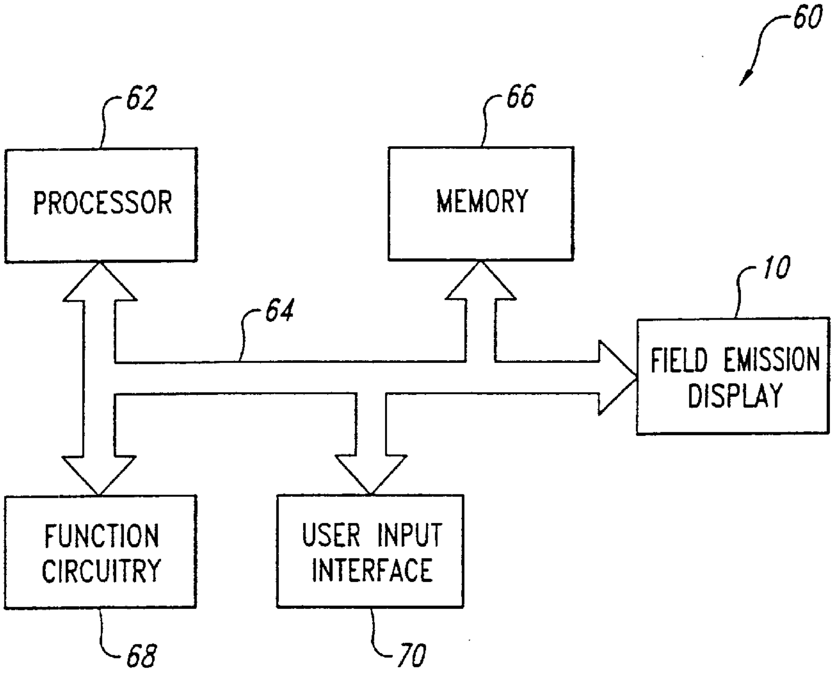
FIG. 6 is a simplified block diagram of a computer including a field emission display using the faceplate of FIG. 5, in accordance with an embodiment of the present invention.

FIG. 6 is a simplified block diagram of a portion of a computer 60 including the field emission display 10 of FIG. 1 together with the faceplate 20' as described with reference to FIGS. 2 through 5 and associated text. The computer 60 includes a central processing unit 62 coupled via a bus 64 to a memory 66, function circuitry 68, a user input interface 70 and the field emission display 10 including the faceplate 20' according to the embodiments of the present invention. The memory 66 may or may not include a memory management module (not shown), but preferably includes both a ROM for storing instructions providing an operating system and a read-write memory for temporary storage of data. The processor 62 operates on data from the memory 66 in response to input data from the user input interface 70 and displays results on the field emission display 10. The processor 62 also stores data in the read-write portion of the memory 66. Examples of systems where the computer 60 finds application include personal/portable computers, camcorders, televisions, automobile electronic systems, microwave ovens and other home and industrial appliances.

Field emission displays 10 for such applications provide significant advantages over other types of displays, including reduced power consumption, improved range of viewing angles, better performance over a wider range of ambient lighting conditions and temperatures and higher speed with which the display can respond. Field emission displays find application in most devices where, for example, liquid crystal displays find application.

Although the present invention has been described with reference to a preferred embodiment, the invention is not limited to this preferred embodiment. Rather, the invention is limited only by the appended claims, which include within their scope all equivalent devices or methods which operate according to the principles of the invention as described.

What is claimed is:

1. A computer system comprising:

a central processing unit;

a memory coupled to the central processing unit, the memory including a ROM storing instructions providing an operating system for the central processing unit and including a read-write memory providing temporary storage of data;

an input device; and a display, the display comprising:

a baseplate comprising:

a substrate;

an emitter formed on the substrate;

a dielectric layer formed on the substrate and including an opening surrounding the emitter; and a conductive extraction grid formed on the dielectric layer and including an opening formed surrounding the emitter; and a faceplate comprising:

a transparent viewing layer;

a transparent conductive layer formed on the transparent viewing layer;

a grille of insulating material formed on the transparent conductive layer and including openings within the grille; and a plurality of localized regions of cathodoluminescent material each formed in a respective one of the openings.

2. The computer of claim 1 wherein the cathodoluminescent material includes noncathodoluminescent material providing reduced resistivity in the cathodoluminescent material.

3. The computer of claim 1 wherein the plurality of localized regions of cathodoluminescent material comprises:

a first plurality of localized regions of first cathodoluminescent material each formed in one of the openings and providing light of a first color in response to electron bombardment, the first cathodoluminescent material including first noncathodoluminescent materials providing reduced resistivity in the first cathodoluminescent material;

a second plurality of localized regions of second cathodoluminescent material each formed in one of the openings and providing light of a second color in response to electron bombardment, the second cathodoluminescent material including second noncathodoluminescent materials providing reduced resistivity in the second cathodoluminescent material; and a third plurality of localized regions of third cathodoluminescent material each formed in one of the openings and providing light of a third color in response to electron bombardment, the third cathodoluminescent material including third noncathodoluminescent materials providing reduced resistivity in the third cathodoluminescent material.

4. The computer of claim 1 wherein:

the cathodoluminescent material includes cathodoluminescent particles having a diameter of two microns or less; and noncathodoluminescent material providing reduced resistivity in the cathodoluminescent material includes metal oxide particles having diameters no larger than one-half micrometer.

5. The display of claim 1 wherein:

the cathodoluminescent material comprises cathodoluminescent particles having a first average diameter that are electrophoretically deposited from a colloidal suspension; and the noncathodoluminescent material comprises metal oxide particles having second diameters each not exceeding one-fourth of the first average diameter.

6. The computer of claim 1 wherein the grille comprises stripes of manganese oxide.

7. The computer of claim 1 wherein the grille comprises stripes of cobalt oxide.

8. The computer of claim 1 wherein the grille comprises stripes of chromium oxide.

* * * * *